July 23, 1935.  J. H. DOXSEE, JR., ET AL  2,008,820
APPARATUS FOR SHELLING MOLLUSKS
Filed Sept. 19, 1933  3 Sheets-Sheet 1
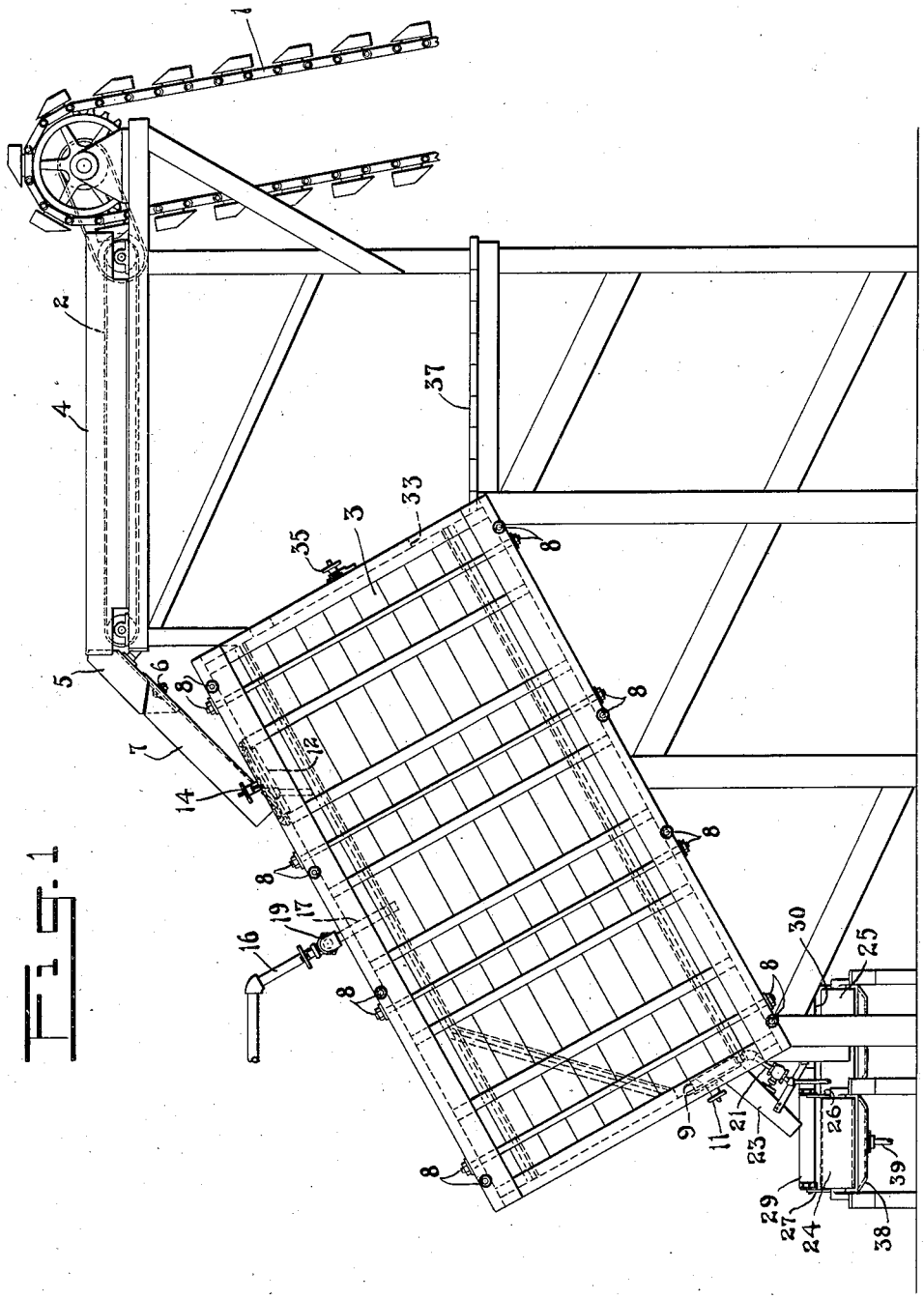
INVENTORS
JAMES H. DOXSEE JR.
WILLIAM H. COOK
BY
Darby & Darby
ATTORNEYS

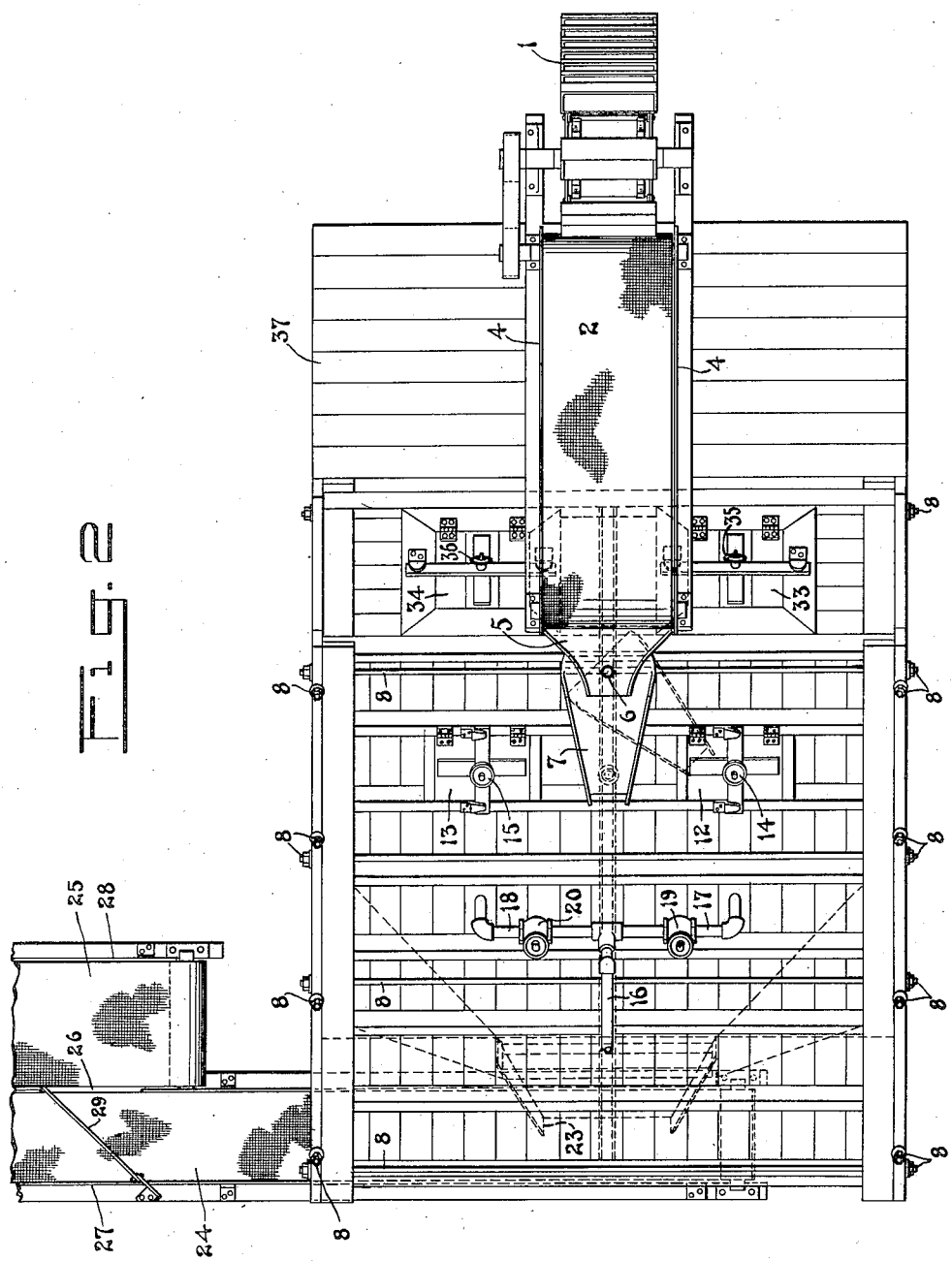

July 23, 1935.  J. H. DOXSEE, JR., ET AL  2,008,820
APPARATUS FOR SHELLING MOLLUSKS
Filed Sept. 19, 1933  3 Sheets-Sheet 3
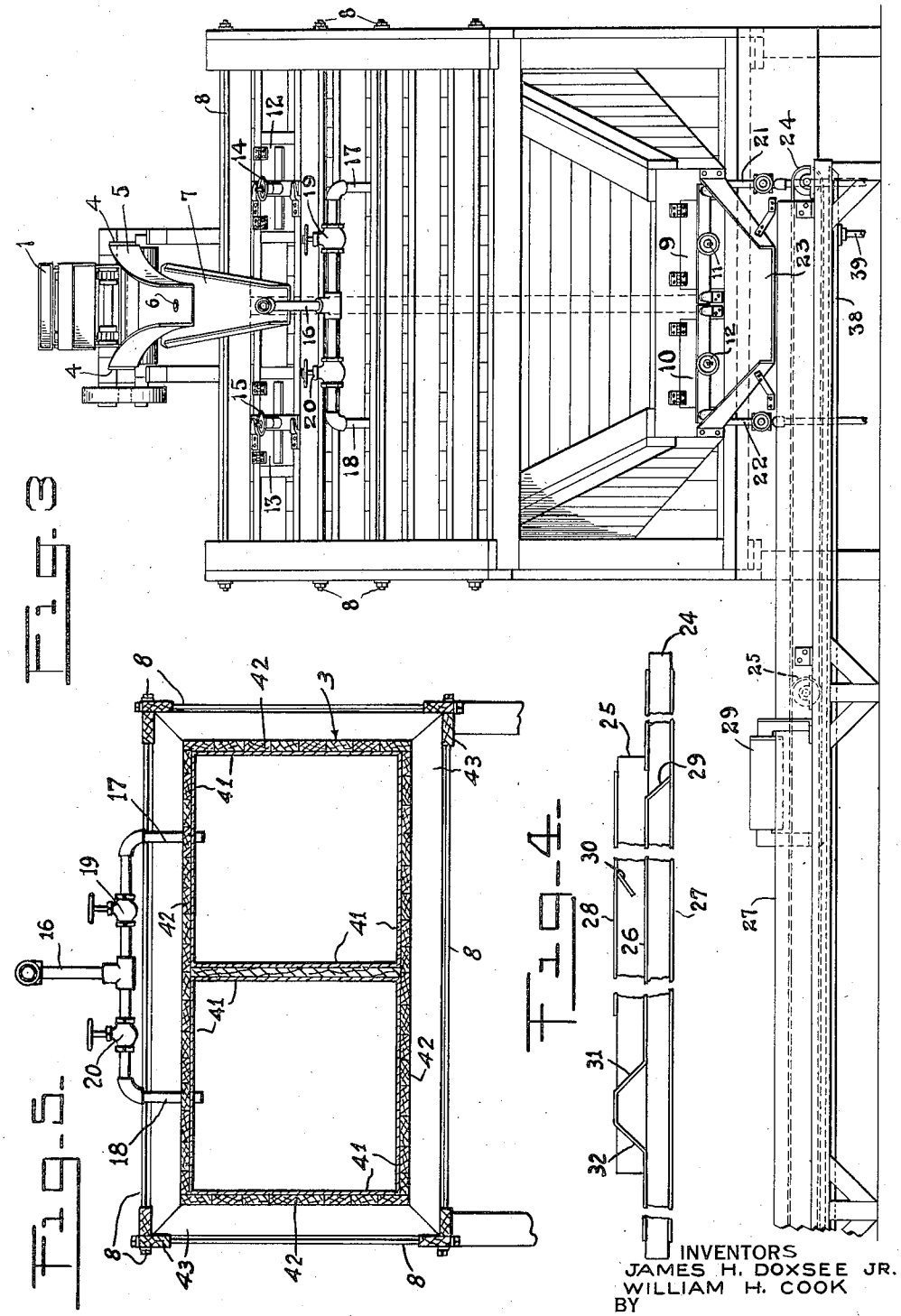
INVENTORS
JAMES H. DOXSEE JR.
WILLIAM H. COOK
BY
Darby & Darby
ATTORNEYS Patented July 23, 1935

2,008,820

UNITED STATES PATENT OFFICE 2,008,820

APPARATUS FOR SHELLING MOLLUSKS

James H. Doxsee, Jr., and William H. Cook, Collier City, Fla., assignors to Fred Fear & Company, Brooklyn, N. Y., a corporation of New York Application September 19, 1933, Serial No. 690,050

7 Claims. (Cl. 17—2)

This invention relates to apparatus for opening mollusks, such as clams, oysters, mussels, and other kinds of shell seafood and separating the meats from the shells.

An object of the invention is to provide a suitable device for shelling mollusks which will be efficient and economical in operation.

A further object of the invention is to provide means for separating meats from the shells, which may be operated as a unitary part of the opening device, and which will be automatic in its operation.

A feature of the invention is a steam box having two compartments fed with the same steam line, an opening in each compartment through which the product to be shelled may be supplied to the boxes alternatively by means of a swiveled chute, an opening for each box through which the opened shells may be removed by force of gravity, and means for collecting the juice from the product which is being cooked in either box.

Another feature of the invention is a pair of movable belts arranged side by side, and means for agitating the product to separate the meats from the shells, and conveying the shells to a desired location along one belt, and the meats to a desired location along the other belt.

In the drawings similar reference numerals refer to similar parts in all of the figures.

Figure 1 is a side elevation of the steam box, showing an endless elevator and a belt for conveying the product to the steam box, and a belt for conveying the product away from the box after the shells have opened;

Fig. 2 is a plan view of the device of Fig. 1, and shows in addition, the arrangement of belts for separating the meats from the opened shells;

Fig. 3 is a front elevation of the apparatus shown in Figs. 1 and 2;

Fig. 4 is a plan view of the double belts for conveying the product from the box, and shows the arrangement for shuffling the product and separating the meats from the shells; and Fig. 5 is a cross section along the line 5—5 of Fig. 1 looking in the direction of the arrows.

The apparatus may be located at the edge of a body of water in which the seafood of the type described may be obtained, or at any other desired location. The product is brought to the apparatus, and it may be raised in an elevator 1 and deposited on an endless belt 2, the upper side of which is moving toward a steam box 3. A stream of water may be played on the product as it is raised on the elevator, to wash it. Channel guides 4 keep the product from falling off the belt 2. On belt 4 the product is conveyed to a chute 5, to which is pivoted at 6 a second chute 7 which, as indicated more clearly in Fig. 2, may be swung over either of two openings in the steam box to deposit the product in either compartment of the box.

The steam box 3 comprises a metallic casing 41, which may be made of stainless steel or other suitable metal, enclosed within a strong framework 42 of well seasoned wood, which is secured by tie rods 8 and frame members 43. The box is set at an angle of approximately 45° and the openings through which it is filled are placed near the upper end of the box so that the box is filled with the product by gravity. The lower end of the box is tapered and enclosed by two doors 9 and 10 which are secured in position by fastening means 11. After one compartment has been filled the chute 7 will be swung over to the other opening. The openings are provided with covers 12 and 13 which may be secured in position by securing means 14 and 15, as is best shown in Fig. 3. After the box is filled with the product the cover is closed and secured in position.

A steam line 16 supplies steam to either compartment by means of branches 17 and 18, Figs. 2 and 3, and the branches of the steam line are provided, respectively, with valves 19 and 20. After a compartment has been filled the steam valve is opened and steam admitted to this compartment. The steam is applied for about twenty minutes. As the product with which the compartment is filled, and the compartment itself, will be relatively cool, there will be for a while a considerable condensation of steam. Outlets 21 and 22 are provided through which the condensed steam may be allowed to escape. The wooden framework supplies suitable insulation to retain the heat during the steaming operation.

After about ten minutes the compartment and its contents will be thoroughly heated, and the shells will begin to open. Due to the insulating framework there will then be little steam condensed in the box, but there will be a considerable flow of juice from the outlet 21 or 22, depending upon which compartment is in use, and this juice may be collected in any suitable manner. As there is no further condensation of steam, this will be pure juice.

At the end of approximately twenty minutes the shells will all be opened and the steam may be shut off by means of valve 19 or 20 and the door 9 or 10 opened. A chute 23 is provided to receive the product as it leaves the box and convey it to a moving belt 24 which carries it away from the box. The chute 23 has oblique sides, as shown, which maintain an even flow of the product from the box and prevent the shells from breaking. A second moving belt 25 is provided directly beside belt 24 and separated therefrom by a channel guide 26. Other guides 27 and 28 keep the product from falling from the belts.

Mounted across belt 24 is a diverting member 29, which may be of wood, metal, or other suitable material. This member is secured in place as shown, and is raised about one inch from the surface of the belt 24. Any meats which become separated from the shells up to this point pass under the diverting member 29 and remain on the belt 24, while the empty shells and the shells still containing meats are shunted by member 29 onto belt 25. The belt 25, which is level with the belt 24 and side by side therewith, is moving in the same direction as the belt 24. The shells therefore move along the belt 25 to shuffling member 30.

The member 30 is similar to the member 29 except that it does not extend all the way across the belt 25. In the process of being shunted from belt 24 to belt 25 by member 29 the product is, of course, shuffled to a considerable extent and many of the meats fall out. The member 30 is raised about one inch from the surface of belt 25 to permit the separated meats to pass thereunder, while the shells are diverted to the narrow passages between the end of member 30 and wall 26, and completely shuffled so that the meats remaining in the shells at this point will fall out. The shells and meats on belt 25 continue their progress along the belt until they reach a second diverting member 31. This member is also raised about one inch from the surface of belt 25 to permit the meats to pass thereunder, but the shells are all diverted by this member so they fall off the belt 25, through the opening in the wall 28 shown, into a suitable receptacle which may be prepared to receive them. The meats pass under the diverting member 31 along the belt 25 until they come to a third diverting member 32. This member 32, unlike the previous diverting members and shuffling member 30, is placed flush with the belt 25 so that the meats cannot pass thereunder. They are, therefore, at this point diverted back to belt 24 through the opening in wall 26 shown and pass along belt 24 to its end where they fall off into a suitable receptacle which may be prepared to receive them at this point.

As the product emerges from the steam compartments there will of course be considerable moisture from the steam and juice accompanying it. A trough 38 may, therefore, be provided underneath the belts 24 and 25 to catch the moisture and discharge it through an outlet 39.

In the embodiment of the device shown the belts 24 and 25 are illustrated as carrying the product away from the steam box at right angles to the flow of the product onto the belt. It will of course be understood that these belts may be placed in line with the flow of the product from the steam box if desired, and in a particular embodiment of the device which has operated successfully this arrangement is used. The drawings have been made, however, to illustrate an arrangement in which the product is taken away from the box at right angles for convenience of illustration. The elevator 1, belts, steam box, etc., are of course all mounted on a suitable frame, as indicated in the drawings but not specifically referred to by reference numeral. The moving parts are actuated by suitable means (not shown), and may be driven by steam from the same boiler which supplies the steam box.

In the operation of this device it is necessary to prevent shell fragments from being broken from the product handled, as these fragments would pass under the diverting members 29 and 31 and be mixed with the meats in the final product. It may therefore be desirable to provide a cushion on which the product is to drop at such points as the interior of the compartments where the product enters, and at exit chute 23. Such cushions may be fastened to the apparatus at the proper position in any suitable manner, and may be made of rubber, or any other suitable material.

It is desirable of course to clean the compartments of the steam box periodically. For this purpose doors 33 and 34 are provided at the upper end of the compartments. These doors may be fastened in position by fastening means indicated at 35 and 36. A platform 37 is provided on which an operator may stand to open the doors 33 and 34 and clean the interior of the steam compartments.

An advantage of the duel compartment arrangement is that while one compartment is being emptied the other compartment may be filled and the contents steamed. Thus a reasonably steady flow of the cooked product may be maintained along the separating belts. Of course additional compartments may be provided, if desired, and the number of compartments, rate of supply of the elevator 1, and rate of discharge of the product from the compartments, may all be regulated for optimum operating conditions.

What is claimed is:

1. A device for separating the shells from the meats of opened mollusks which comprises two belts moving side by side, means for supplying one belt with the product, means for shunting the shells to the second belt while permitting the separated meats to remain on the first belt, means for shuffling the shells on said second belt, means for removing the shells from said second belt while permitting the separated meats to remain on said second belt, and means for shunting the meats on said second belt back to said first belt.

2. A device for separating the shells from the meats of opened mollusks comprising a plurality of belts, means for shuffling said mollusks to permit the meats to separate from the shells, and means for directing the shells to one belt and the meats to another belt.

3. A device for separating the shells from the meats of opened mollusks comprising a pair of belts, a shunting member raised from the surface of the first belt, a shuffling member raised from the surface of the second belt, a diverting member raised from the surface of the second belt, and a second diverting member flush with the surface of said second belt.

4. In combination with a steam box having a delivery opening therein, a pair of belts adjacent said opening, and shuffling and diverting members arranged in operative relation with said belts.

5. Means for separating the shells from the meats of clams and the like comprising a steam box having a delivery opening therein, a pair of belts adjacent said opening, means for shuffling said clams and the like, and means for directing the shells to one belt and the meats to another belt.

6. Means for separating the shells from the meats of clams and the like comprising a steam box, means for supplying clams and the like to said box, means for supplying steam to said box, a pair of belts, means for delivering the clams and the like from said box to said belts, means for shuffling said clams and the like to permit the meat to separate from the shells, and means to direct the shells to one location and the meats to another location.

7. A device in accordance with claim 6 in which there are a plurality of steam boxes arranged to deliver their contents to the pair of belts.

JAMES H. DOXSEE, Jr.
WILLIAM H. COOK.